US010785645B2

(12) United States Patent
Li et al.

(10) Patent No.: US 10,785,645 B2
(45) Date of Patent: Sep. 22, 2020

(54) TECHNIQUES FOR DYNAMICALLY SUPPORTING DIFFERENT AUTHENTICATION ALGORITHMS

(71) Applicant: Apple Inc., Cupertino, CA (US)

(72) Inventors: Li Li, Los Altos, CA (US); Jerrold Von Hauck, Windermere, FL (US); Arun G. Mathias, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 124 days.

(21) Appl. No.: 14/868,257

(22) Filed: Sep. 28, 2015

(65) Prior Publication Data
US 2016/0249214 A1 Aug. 25, 2016

Related U.S. Application Data

(60) Provisional application No. 62/119,755, filed on Feb. 23, 2015.

(51) Int. Cl.
*H04W 12/06* (2009.01)
*H04W 12/04* (2009.01)
(Continued)

(52) U.S. Cl.
CPC ............ *H04W 12/06* (2013.01); *H04L 63/08* (2013.01); *H04L 63/102* (2013.01); *H04W 4/60* (2018.02);
(Continued)

(58) Field of Classification Search
CPC ..... H04W 12/04; H04W 12/06; H04W 12/08; H04W 4/003; H04W 4/005; H04W 8/205;
(Continued)

(56) References Cited

U.S. PATENT DOCUMENTS 6,690,930 B1 * 2/2004 Dupre ................. H04L 63/0853
455/411
8,411,858 B2 * 4/2013 Muhanna .............. H04L 63/068
380/248
(Continued)

FOREIGN PATENT DOCUMENTS

CN 1906560 A 1/2007
EP 2448216 A1 5/2012
(Continued)

OTHER PUBLICATIONS

Japanese Patent Application No. 2016-017394—Office Action dated Apr. 14, 2017.
(Continued)

*Primary Examiner* — Shahriar Zarrineh
(74) *Attorney, Agent, or Firm* — Dickinson Wright RLLP (57) ABSTRACT

Disclosed herein are different techniques for enabling a mobile device to dynamically support different authentication algorithms. A first technique involves configuring an eUICC included in the mobile device to implement various authentication algorithms that are utilized by MNOs (e.g., MNOs with which the mobile device can interact). Specifically, this technique involves the eUICC storing executable code for each of the various authentication algorithms. According to this technique, the eUICC is configured to manage at least one eSIM, where the eSIM includes (i) an identifier that corresponds to one of the various authentication algorithms implemented by the eUICC, and (ii) authentication parameters that are compatible with the authentication algorithm. A second technique involves configuring the eUICC to interface with an eSIM to extract (i) executable code for an authentication algorithm used by an MNO that corresponds to the eSIM, and (ii) authentication parameters that are compatible with the authentication algorithm.

16 Claims, 6 Drawing Sheets

(51) Int. Cl.
  *H04L 29/06*    (2006.01)
  *H04W 12/08*    (2009.01)
  *H04W 4/60*     (2018.01)
  *H04W 4/70*     (2018.01)
  *H04W 12/00*    (2009.01)
  *H04W 8/20*     (2009.01)

(52) U.S. Cl.
  CPC ......... *H04W 4/70* (2018.02); *H04W 12/0023* (2019.01); *H04W 12/04* (2013.01); *H04W 12/08* (2013.01); *H04W 8/205* (2013.01)

(58) Field of Classification Search
  CPC ..... H04W 4/60; H04W 4/70; H04W 12/0023; H04L 63/08; H04L 63/102; H04L 67/306
  USPC ............................................................ 726/9
  See application file for complete search history.

(56) References Cited

U.S. PATENT DOCUMENTS

| | | | | |
|---|---|---|---|---|
| 9,020,479 | B1* | 4/2015 | Somayajula | H04W 48/18 455/418 |
| 9,247,424 | B2 | 1/2016 | Haggerty et al. | |
| 9,438,600 | B2 | 9/2016 | Haggerty et al. | |
| 2002/0009199 | A1* | 1/2002 | Ala-Laurila | H04L 63/061 380/247 |
| 2005/0108171 | A1 | 5/2005 | Bajikar et al. | |
| 2005/0182802 | A1* | 8/2005 | Beaudou | H04L 63/20 708/200 |
| 2006/0046693 | A1* | 3/2006 | Tran | H04L 63/0853 455/411 |
| 2006/0120351 | A1* | 6/2006 | Rajagopalan | H04L 12/66 370/352 |
| 2007/0213050 | A1* | 9/2007 | Jiang | H04W 8/04 455/432.3 |
| 2009/0125996 | A1* | 5/2009 | Guccione | H04L 63/0853 726/6 |
| 2010/0062808 | A1* | 3/2010 | Cha | G06Q 20/3229 455/558 |
| 2010/0151823 | A1* | 6/2010 | Dagorn | H04L 63/0853 455/411 |
| 2010/0162370 | A1* | 6/2010 | Altay | G06F 21/335 726/5 |
| 2010/0203864 | A1* | 8/2010 | Howard | H04W 8/18 455/411 |
| 2011/0119492 | A1* | 5/2011 | Palanigounder | H04L 63/0884 713/171 |
| 2012/0108204 | A1* | 5/2012 | Schell | H04W 8/205 455/411 |
| 2012/0108205 | A1* | 5/2012 | Schell | H04L 63/0823 455/411 |
| 2012/0108207 | A1* | 5/2012 | Schell | H04L 63/0853 455/411 |
| 2012/0108295 | A1* | 5/2012 | Schell | H04W 4/001 455/558 |
| 2012/0115441 | A1* | 5/2012 | Schell | H04L 63/0853 455/411 |
| 2012/0117635 | A1* | 5/2012 | Schell | G06F 21/34 726/9 |
| 2012/0135710 | A1* | 5/2012 | Schell | G06F 12/0246 455/411 |
| 2012/0260095 | A1* | 10/2012 | Von Hauck | H04L 9/3228 713/176 |
| 2013/0005402 | A1* | 1/2013 | Bradley | H04L 43/50 455/558 |
| 2013/0017862 | A1* | 1/2013 | Lee | H04W 60/005 455/558 |
| 2013/0058216 | A1* | 3/2013 | Krishnaswamy | H04W 88/06 370/241 |
| 2013/0095794 | A1* | 4/2013 | Lhamon | H04W 12/0609 455/411 |
| 2013/0122864 | A1* | 5/2013 | Haggerty | H04L 63/105 455/411 |
| 2013/0132854 | A1* | 5/2013 | Raleigh | G06F 3/0482 715/738 |
| 2013/0137484 | A1* | 5/2013 | Torres | H04B 1/3816 455/558 |
| 2013/0157673 | A1* | 6/2013 | Brusilovsky | H04W 4/70 455/450 |
| 2013/0165073 | A1 | 6/2013 | Madsen | |
| 2013/0165075 | A1* | 6/2013 | Rishy-Maharaj | H04W 12/04 455/411 |
| 2013/0210388 | A1* | 8/2013 | Li | H04W 48/06 455/411 |
| 2013/0219180 | A1* | 8/2013 | Saino | G06F 21/42 713/171 |
| 2013/0227646 | A1* | 8/2013 | Haggerty | H04L 63/0853 726/3 |
| 2013/0303122 | A1* | 11/2013 | Li | H04W 8/20 455/411 |
| 2013/0312014 | A1* | 11/2013 | Tsai | G06F 9/44 719/320 |
| 2013/0331063 | A1* | 12/2013 | Cormier | H04L 63/0272 455/411 |
| 2013/0344855 | A1* | 12/2013 | Li | H04W 4/16 455/417 |
| 2014/0051422 | A1* | 2/2014 | Mittal | H04W 12/04 455/419 |
| 2014/0087790 | A1* | 3/2014 | Babbage | H04W 8/183 455/558 |
| 2014/0101449 | A1* | 4/2014 | Trujillo Gonzalez | H04W 8/183 713/171 |
| 2014/0141760 | A1* | 5/2014 | Ganesh | H04W 8/205 455/418 |
| 2014/0219448 | A1* | 8/2014 | Froels | H04L 9/14 380/255 |
| 2014/0228039 | A1* | 8/2014 | Zhao | H04B 1/3816 455/450 |
| 2014/0237101 | A1* | 8/2014 | Park | H04L 67/303 709/223 |
| 2014/0308991 | A1* | 10/2014 | Lee | H04W 8/183 455/558 |
| 2014/0315535 | A1* | 10/2014 | Bajko | H04W 8/20 455/419 |
| 2015/0031337 | A1* | 1/2015 | Adenuga | G06F 21/35 455/411 |
| 2015/0056960 | A1* | 2/2015 | Egner | H04W 12/08 455/411 |
| 2015/0072650 | A1* | 3/2015 | Xia | H04W 12/06 455/411 |
| 2015/0089214 | A1* | 3/2015 | Dupre | H04L 63/0853 713/155 |
| 2015/0110035 | A1* | 4/2015 | Lee | H04W 8/183 370/329 |
| 2015/0163056 | A1* | 6/2015 | Nix | H04L 9/0869 380/46 |
| 2015/0281198 | A1* | 10/2015 | Lee | H04W 8/18 726/7 |
| 2015/0281957 | A1* | 10/2015 | Hartel | H04M 1/675 455/411 |
| 2015/0304506 | A1* | 10/2015 | Zhu | H04M 15/49 455/406 |
| 2015/0334111 | A1 | 11/2015 | Ziat | |
| 2015/0350879 | A1* | 12/2015 | Li | H04W 8/183 455/558 |
| 2015/0350881 | A1* | 12/2015 | Weiss | H04W 4/001 455/558 |
| 2015/0382178 | A1* | 12/2015 | Park | H04L 63/0853 455/411 |
| 2016/0014280 | A1* | 1/2016 | Brunsman | H04M 15/774 455/407 |
| 2016/0088467 | A1* | 3/2016 | Reddem | H04W 8/20 455/418 |
| 2016/0142906 | A1* | 5/2016 | Park | H04W 4/50 455/419 |
| 2016/0174069 | A1* | 6/2016 | Bruner | H04W 8/18 455/411 |

(56) References Cited

U.S. PATENT DOCUMENTS

| | | | |
|---|---|---|---|
| 2016/0182110 A1* | 6/2016 | Selvaraj | H04B 1/3816 |
| | | | 455/558 |
| 2016/0316368 A1* | 10/2016 | Gan | H04W 12/06 |
| 2016/0353274 A1* | 12/2016 | Chichierchia | H04B 1/3816 |
| 2017/0041864 A1* | 2/2017 | Kaliner | H04W 8/205 |
| 2017/0142162 A1* | 5/2017 | Zhang | H04L 63/205 |
| 2017/0152355 A1* | 6/2017 | Kunc | C08J 5/06 |
| 2017/0155516 A1* | 6/2017 | Bergius | H04L 9/3271 |
| 2019/0364416 A1* | 11/2019 | Dumoulin | H04W 8/245 |
| 2020/0045544 A1* | 2/2020 | Yu | H04L 63/0869 |

FOREIGN PATENT DOCUMENTS

| | | | | |
|---|---|---|---|---|
| EP | 2675203 A1 | | 12/2013 | |
| JP | 2012221511 A | | 11/2012 | |
| JP | 2015512209 A | | 4/2015 | |
| KR | 20140081234 | * | 6/2014 | H04W 8/83 |
| WO | 2012058446 A1 | | 5/2012 | |
| WO | 2012058446 A1 | | 5/2012 | |
| WO | 2012154600 A1 | | 11/2012 | |
| WO | 2013123233 A2 | | 8/2013 | |
| WO | 2014043040 A1 | | 3/2014 | |
| WO | WO-2014043040 A1 | * | 3/2014 | H04W 12/08 |
| WO | 2014122588 A1 | | 8/2014 | |
| WO | WO-2014122588 A1 | * | 8/2014 | H04L 63/0853 |
| WO | WO 2015177397 A1 | * | 11/2015 | H04L 9/3271 |

OTHER PUBLICATIONS

European Patent Application No. 16152557.1, Extended European Search Report dated Apr. 14, 2016.

Australian Patent Application No. 2016200820—Examination Report dated Nov. 24, 2016.

"Universal Mobile Telecommunications System (UMTS); 3G Security; Security Architecture", 3GPP TS 33.102, Version 3.6.0, Release 1999, Oct. 2000, pp. 1-64.

"Universal Mobile Telecommunications System (UMTS); LTE; Specification of the TUAK algorithm set: A second example algorithm set for the 3GPP authentication and key generation functions f1, f1*, f2, f3, f4, f5 and f5*; Document 1: Algorithm specification", 3GPP TS 35.231, Version 12.1.0, Release 12, Oct. 2014, pp. 1-29.

"Universal Mobile Telecommunications System (UMTS); LTE; 3G Security; Specification of the Milenage algorithm set: An example algorithm set for the 3GPP authentication and key generation functions f1, f1*, f2, f3, f4, f5 and f5*, Document 2: Algorithm specification", 3GPP TS 35.206, Version 9.0.0, Release 9, Feb. 2010, pp. 1-33.

Japanese Patent Application No. 2016-017394—Second Office Action dated Mar. 2, 2018.

Japanese Patent Application No. 2016-017394—Final Office Action dated Sep. 21, 2018.

Chinese Application Patent No. 201610095037.6—First Office Action dated Dec. 4, 2018.

Chinese Application Patent No. 201610095037.6—Second Office Action dated Jan. 3, 2019.

European Patent Application 16152557.1—First Communication Pursuant to Art. 94 (3) EPC dated Feb. 26, 2019.

Japanese Patent Application No. 2016-017394—Examiner's Pre-Review Report (EPRR) dated Mar. 26, 2019.

Chinese Application Patent No. 201610095037.6—Third Office Action dated Aug. 2, 2019.

Indian Patent Application No. 201614002793—First Examination Report dated Nov. 20, 2019.

* cited by examiner

TECHNIQUES FOR DYNAMICALLY SUPPORTING DIFFERENT AUTHENTICATION ALGORITHMS

CROSS-REFERENCE TO RELATED APPLICATIONS

The present application claims the benefit of U.S. Provisional Application No. 62/119,755, filed Feb. 23, 2015, the content of which is incorporated herein by reference in its entirety for all purposes.

FIELD

The described embodiments set forth a technique for enabling mobile devices to dynamically support different authentication algorithms when authenticating with Mobile Network Operators (MNOs).

BACKGROUND

Most mobile devices are configured to operate with removable Universal Integrated Circuit Cards (UICCs) that enable the mobile devices to access services provided by MNOs. Typically, a UICC takes the form of a small removable card—commonly referred to as a Subscriber Identity Module (SIM) card—that is configured to be inserted into a UICC-receiving bay included in a mobile device. In present implementations, a UICC corresponds to a particular MNO, and includes at least a microprocessor and a read-only memory (ROM) that stores (i) an MNO profile, and (ii) code for an operating system (OS) configured to execute on the microprocessor. The OS, upon activation, connects to an MNO (e.g., via a baseband component included in the mobile device) and carries out an authentication algorithm with the MNO using parameters included in the MNO profile. One drawback of this design is that authentication algorithm flexibility is severely constrained, as the content stored on SIM cards is not designed to be modified after being manufactured. As a result, an adoption of a new authentication algorithm by an MNO would require widespread distribution of replacement SIM cards that are designed to utilize the new authentication algorithm, which is largely impractical.

Notably, in more recent implementations, UICCs are being embedded directly into system boards of mobile devices. These embedded UICCs (eUICCs) can provide several advantages over traditional, removable UICCs. For example, some eUICCs include a rewritable memory and enable usage of electronic Subscriber Identity Modules (eSIMs) that provide similar functionality as the traditional removable SIM cards described above. eSIMs, however, are more flexible than SIM cards, as eSIMs can be electronically added to, modified within, and removed from the rewritable memory of the eUICC. This flexibility creates potential for mobile devices and MNOs to implement features that can enhance efficiency and user satisfaction.

SUMMARY

In some embodiments, a method is set forth for enabling a mobile device to dynamically support different authentication algorithms. The method is carried out by an eUICC included in the mobile device, and includes the steps of (1) receiving a selection of an eSIM that is managed by the eUICC, (2) querying the eSIM for an identifier that corresponds to an authentication algorithm that is implemented by the eUICC, (3) querying the eSIM for authentication parameters that correspond to the authentication algorithm, (4) providing, to the authentication algorithm, the authentication parameters, and (5) executing the authentication algorithm in accordance with the authentication parameters.

In other embodiments, a method is set forth for enabling a mobile device to dynamically support different authentication algorithms. The method is carried out by an eUICC included in the mobile device, and includes the steps of (1) receiving a selection of an eSIM that is managed by the eUICC, (2) querying the eSIM for first logic that corresponds to a first authentication algorithm that is specific to the eSIM, (3) querying the eSIM for first authentication parameters that correspond to the first authentication algorithm, (4) providing, to the first authentication algorithm, the first authentication parameters, and (5) executing the first authentication algorithm in accordance with the first authentication parameters.

Other embodiments set forth an eUICC configured to dynamically support different authentication algorithms. Specifically, the eUICC includes (1) a memory configured to store: a plurality of eSIMs, and a plurality of authentication algorithms, and (2) a processor configured to carry out steps that include: (i) receiving a selection of an eSIM from the plurality of eSIMs, (ii) querying the eSIM for an identifier that corresponds to a particular authentication algorithm included in the plurality of authentication algorithms, (iii) querying the eSIM for authentication parameters that correspond to the particular authentication algorithm, (iv) providing, to the particular authentication algorithm, the authentication parameters, and (v) executing the particular authentication algorithm in accordance with the authentication parameters.

Other embodiments set forth a mobile device configured to dynamically support different authentication algorithms. Specifically, the mobile device includes an embedded Universal Integrated Circuit Card (eUICC) that is configured to carry out steps that include: (1) receiving a selection of an eSIM that is managed by the eUICC, (2) querying the eSIM for first logic that corresponds to a first authentication algorithm that is specific to the eSIM, (3) querying the eSIM for first authentication parameters that correspond to the first authentication algorithm, (4) providing, to the first authentication algorithm, the first authentication parameters, and (5) executing the first authentication algorithm in accordance with the first authentication parameters.

Other embodiments include a non-transitory computer readable medium configured to store instructions that, when executed by a processor, cause the processor to implement any of the foregoing steps.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Other aspects and advantages of the embodiments described herein will become apparent from the following detailed description taken in conjunction with the accompanying drawings which illustrate, by way of example, the principles of the described embodiments.

BRIEF DESCRIPTION OF THE DRAWINGS

The included drawings are for illustrative purposes and serve only to provide examples of possible structures and arrangements for the disclosed inventive apparatuses and methods for providing wireless computing devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

DETAILED DESCRIPTION

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

The embodiments described herein set forth two different techniques for enabling a mobile device to dynamically support different authentication algorithms. The different authentication algorithms described herein pertain to algorithms that are used by the mobile device to establish a secure connection with an MNO so that the mobile device can consume services provided by the MNO.

A first of the two techniques involves configuring an eUICC included in the mobile device to implement various authentication algorithms that are utilized by different MNOs (e.g., MNOs with which the mobile device is designed to interact). Specifically, this technique involves the eUICC storing executable code for each of the various authentication algorithms. According to this technique, the eUICC is configured to manage at least one eSIM, where the eSIM includes (i) an identifier that corresponds to one of the various authentication algorithms implemented by the eUICC, and (ii) authentication parameters that are compatible with the authentication algorithm. In this manner, when the eUICC is tasked with connecting to an MNO that corresponds to a particular eSIM, the eUICC identifies, based on the identifier included in the particular eSIM, the authentication algorithm to use, and provides to the authentication algorithm the authentication parameters included in the particular eSIM. In turn, the eUICC establishes a secure connection with the MNO in accordance with the authentication algorithm. Thus, according to the first technique, MNOs and mobile devices can achieve authentication algorithm flexibility by exchanging new or updated eSIMs that include the necessary information (i.e., (i) the identifier, and (ii) the authentication parameters), so long as the eUICC is configured to implement the authentication algorithm to which the identifier corresponds. In situations where the eUICC does not immediately support an authentication algorithm referenced by an eSIM, the eUICC can be updated (e.g., through an over the air (OTA) update) to support the new algorithm, which can involve receiving the executable code—also referred to herein as "logic"—that corresponds to the authentication algorithm.

A second of the two techniques does not involve storing executable code for the various authentication algorithms within the eUICC (as with the first technique), but instead involves configuring the eUICC to interface with an eSIM to extract (i) executable code for an authentication algorithm used by an MNO that corresponds to the eSIM, and (ii) authentication parameters that are compatible with the authentication algorithm. In turn, the eUICC can implement the extracted authentication algorithm (by executing the executable code), and provide the extracted authentication parameters to the extracted authentication algorithm to establish a secure connection with the MNO. Thus, according to the second technique, MNOs and mobile devices can achieve authentication algorithm flexibility by exchanging new or updated eSIMs that include the necessary information (i.e., (i) the executable code, and (ii) the authentication parameters) to implement different authentication algorithms.

The embodiments set forth herein further enable MNOs to reconfigure, e.g., via an OTA trigger, the authentication algorithms utilized by mobile devices that subscribe to services provided by the MNOs. To implement this feature, eSIMs can be configured to store different sets of authentication parameters for different authentication algorithms that are currently implemented—or will eventually be implemented—by the MNOs that correspond to the eSIMs. For example, an eSIM included in a mobile device can include a first set of authentication parameters (e.g., MILENAGE parameters) that correspond to a first authentication algorithm (e.g., MILENAGE authentication algorithm), and can further include a second set of authentication parameters (e.g., TUAK parameters) that correspond to a second authentication algorithm (e.g., TUAK authentication algorithm). According to this example, the MNO that corresponds to the eSIM can dynamically switch from utilizing the first authentication algorithm to utilizing the second authentication algorithm, and indicate the switch to the eSIM (e.g., via an OTA trigger). In turn, the eSIM correspondingly utilizes the second set of authentication parameters and the second authentication algorithm when attempting to authenticate with the MNO, thereby achieving the above-described flexible authentication algorithm techniques.

In accordance with various embodiments described herein, the terms "wireless communication device," "wireless device," "mobile device," "mobile station," and "user equipment" (UE) may be used interchangeably herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) LTE, LTE Advanced (LTE-A), and/or 5G or other present or future developed advanced cellular wireless networks.

The wireless communication device, in some embodiments, can also operate as part of a wireless communication system, which can include a set of client devices, which can also be referred to as stations, client wireless devices, or client wireless communication devices, interconnected to an access point (AP), e.g., as part of a WLAN, and/or to each other, e.g., as part of a WPAN and/or an "ad hoc" wireless network. In some embodiments, the client device can be any wireless communication device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies.

Additionally, it should be understood that the UEs described herein may be configured as multi-mode wireless communication devices that are also capable of communicating via different third generation (3G) and/or second generation (2G) RATs. In these scenarios, a multi-mode UE can be configured to prefer attachment to LTE networks offering faster data rate throughput, as compared to other 3G legacy networks offering lower data rate throughputs. For instance, in some implementations, a multi-mode UE may be configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

Figure 1:
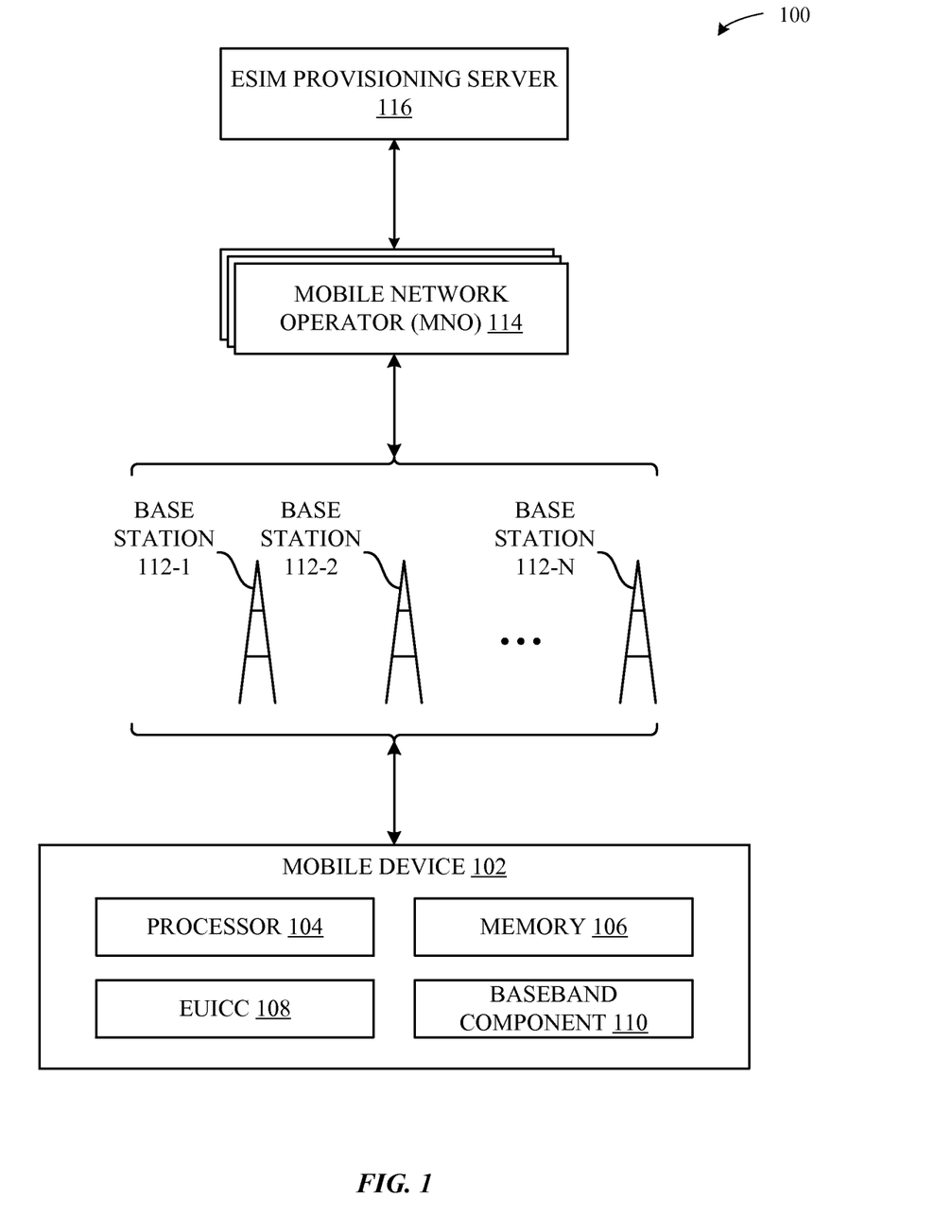
FIG. 1 illustrates a block diagram of different components of a system configured to implement the various techniques described herein, according to some embodiments.

FIG. 1 illustrates a block diagram of different components of a system 100 that is configured to implement the various techniques described herein, according to some embodiments. More specifically, FIG. 1 illustrates a high-level overview of the system 100, which, as shown, includes a mobile device 102, a group of base stations 112 that are managed by different MNOs 114, and an eSIM provisioning server 116. According the illustration of FIG. 1, the mobile device 102 can represent a mobile computing device (e.g., an iPhone® or an iPad® by Apple®), the base stations 112 can represent different radio towers that are configured to communicate with the mobile device 102, and the MNOs 114 can represent different wireless service providers that provide specific services (e.g., voice and data) to which the mobile device 102 can be subscribed. Moreover, and as described in greater detail below, the eSIM provisioning server 116 can represent one or more servers that are configured to deliver eSIMs to the mobile device 102—in particular, an eUICC 108 included in the mobile device 102—in a manner that enables the MNOs 114 and the mobile device 102 to dynamically support different authentication algorithms.

As shown in FIG. 1, the mobile device 102 can include a processor 104, a memory 106, an eUICC 108, and a baseband component 110. These components work in conjunction to enable the mobile device 102 to provide useful features to a user of the mobile device 102, such as localized computing, location based services, and Internet connectivity. As described in greater detail below, the eUICC 108 can be configured to store multiple eSIMs for accessing the different MNOs 114 through the base stations 112. For example, the eUICC 108 can be configured to store an eSIM for each MNO 114 to which mobile device 102 is subscribed. As also described in greater detail below, the mobile device 102—specifically, the eUICC 108 included in the mobile device 102—can be configured to implement a variety of authentication algorithms required by different MNOs 114, thereby enabling the mobile device 102 to evolve and remain compatible with the security requirements of the MNOs 114 over time.

Figure 2A:
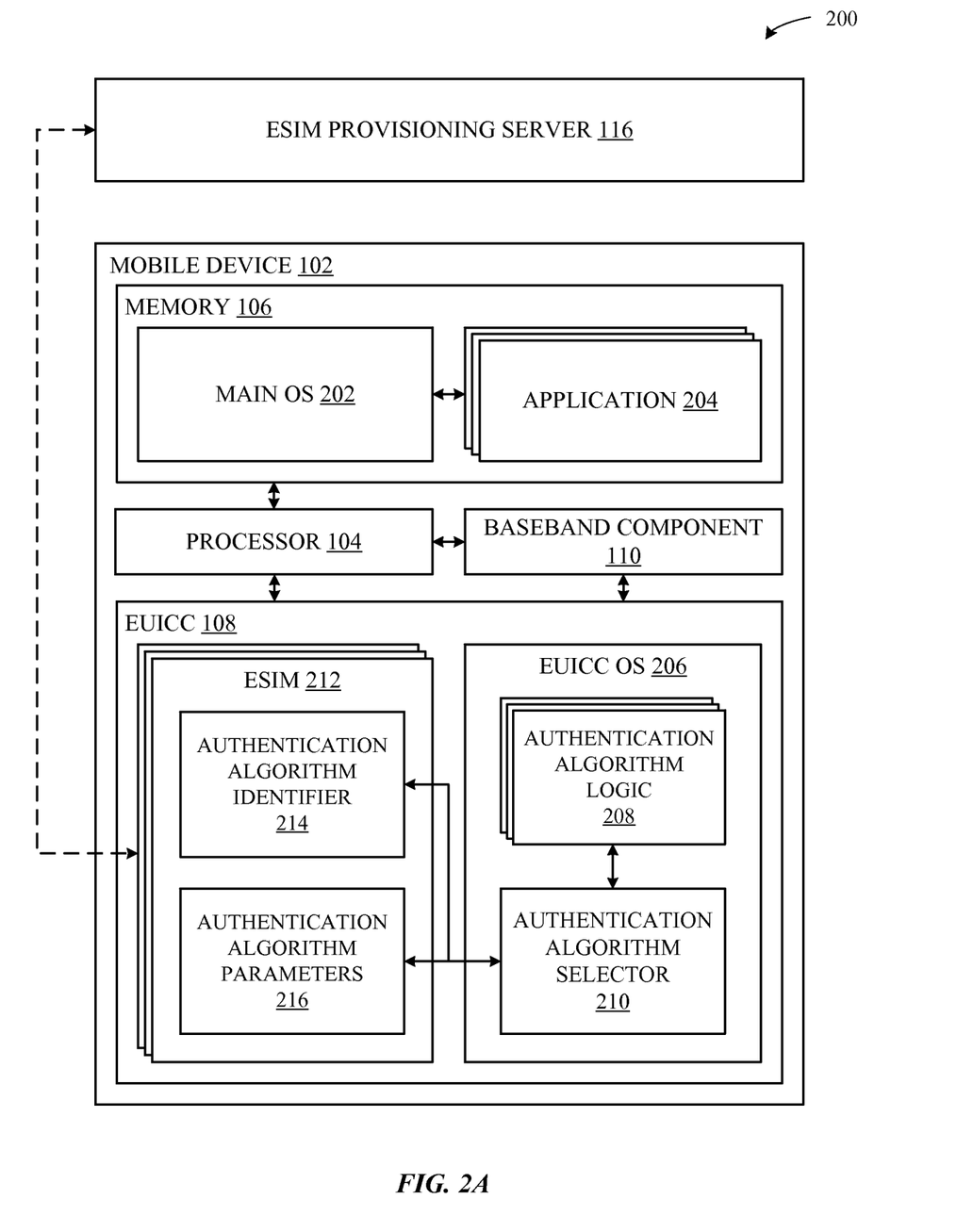
FIG. 2A illustrates a block diagram of a more detailed view of particular components of a mobile device of FIG. 1 that are configured to implement a first technique for dynamically supporting different authentication algorithms, according to some embodiments.

FIG. 2A illustrates a block diagram of a more detailed view 200 of particular components of the mobile device 102 of FIG. 1 that are configured to implement the first technique for dynamically supporting different authentication algorithms, according to some embodiments. As shown in FIG. 2A, the processor 104, in conjunction with the memory 106, can implement a main operating system (OS) 202 that is configured to execute applications 204 (e.g., native OS applications and user applications). The eUICC 108 can be configured to implement an eUICC OS 206 that is configured to manage the hardware resources of the eUICC 108 (e.g., a processor, a random access memory (RAM), and a non-volatile memory, not illustrated in FIG. 2A). As also shown in FIG. 2A, the eUICC OS 206 is configured to include various authentication algorithm logic 208 (e.g., executable code), which represents different algorithms utilized by different MNOs 114 with which the mobile device 102 is configured to communicate. The eUICC OS 206 is also configured to include an authentication algorithm selector 210, which, as described in greater detail below, is configured to, upon receipt of a command to activate an eSIM 212, interface with the eSIM 212 and extract (i) an identifier that corresponds to an authentication algorithm logic 208, and (ii) authentication algorithm parameters that correspond to the authentication algorithm logic 208. As further shown in FIG. 2A, each eSIM 212 is associated with an authentication algorithm identifier 214 and authentication algorithm parameters 216, which are provided to the authentication algorithm selector 210 when the eSIM 212 is activated.

Figure 2B:
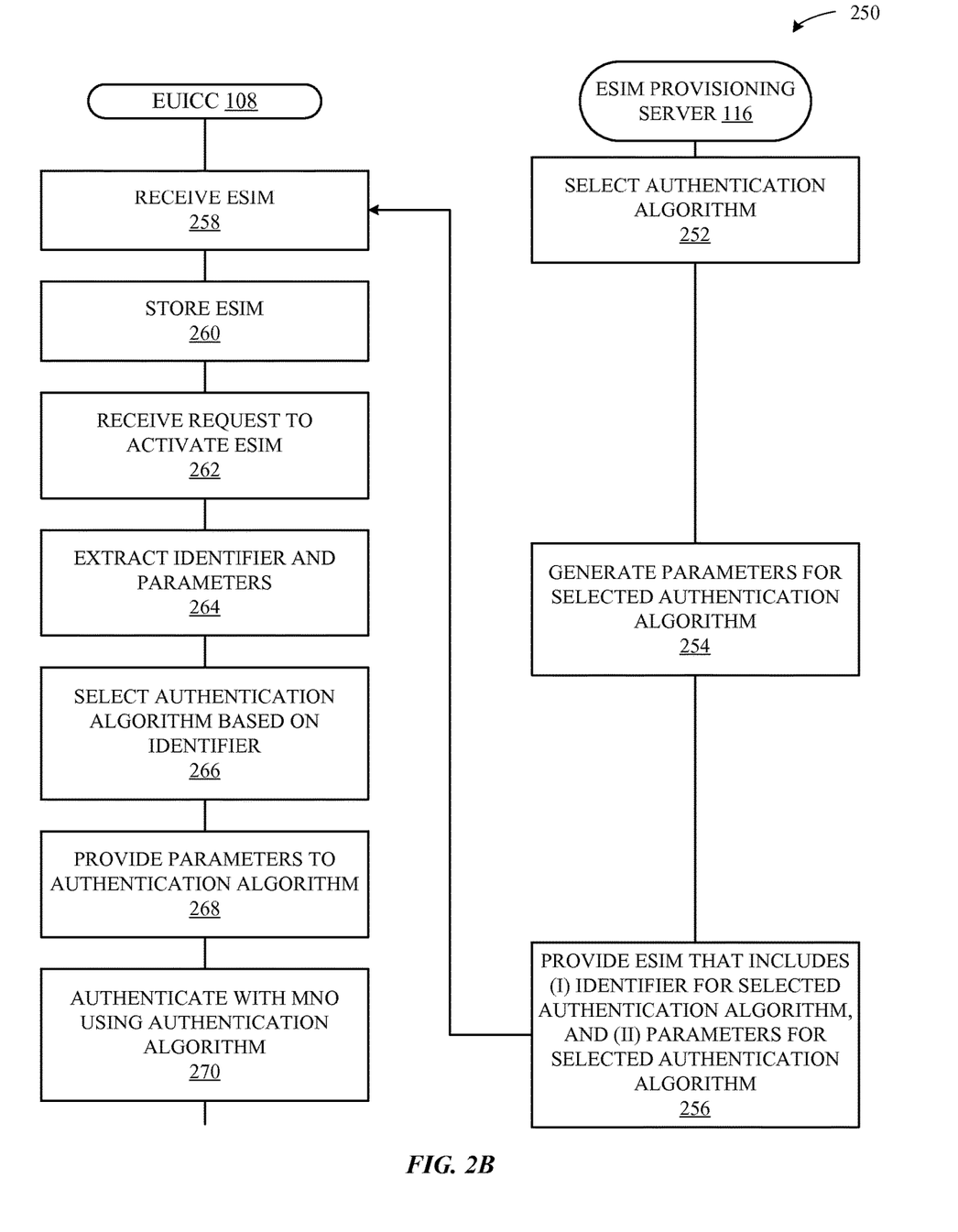
FIG. 2B illustrates a sequence diagram of a method for implementing the first technique for dynamically supporting different authentication algorithms, according to some embodiments.

FIG. 2B illustrates a sequence diagram of a method 250 for implementing the first technique for dynamically supporting different authentication algorithms, according to some embodiments. As shown in FIG. 2B, the method 250 begins at step 252, where the eSIM provisioning server 116 selects an authentication algorithm to be utilized by an MNO 114 that is requesting an eSIM 212. At step 254, the eSIM provisioning server 116 generates parameters for the selected authentication algorithm. At step 256, the eSIM provisioning server 116 provides the eSIM 212, which includes (i) an identifier for the selected authentication algorithm (e.g., an authentication algorithm identifier 214), and (ii) parameters (e.g., authentication algorithm parameters 216) for the selected authentication algorithm.

At step 258, the eUICC 108 receives the eSIM 212, and at step 260, the eUICC 108 stores the eSIM 212 within the eUICC 108 (e.g., in a non-volatile memory accessible to the eUICC 108). At step 262, the eUICC 108 receives a request to activate the eSIM 212 (e.g., from the main OS 202). At step 264, the eUICC 108—specifically, the authentication algorithm selector 210—extracts from the eSIM 212 (i) the authentication algorithm identifier 214, and (ii) the authentication algorithm parameters 216. At step 266, the authentication algorithm selector 210 selects an authentication algorithm logic 208 that corresponds to the extracted authentication algorithm identifier 214. At step 268, the authentication algorithm selector 210 provides the authentication algorithm parameters 216 to the selected authentication algorithm logic 208. Finally, at step 270, the eUICC 108 authenticates with the MNO 114 using the selected authentication algorithm.

Figure 3A:
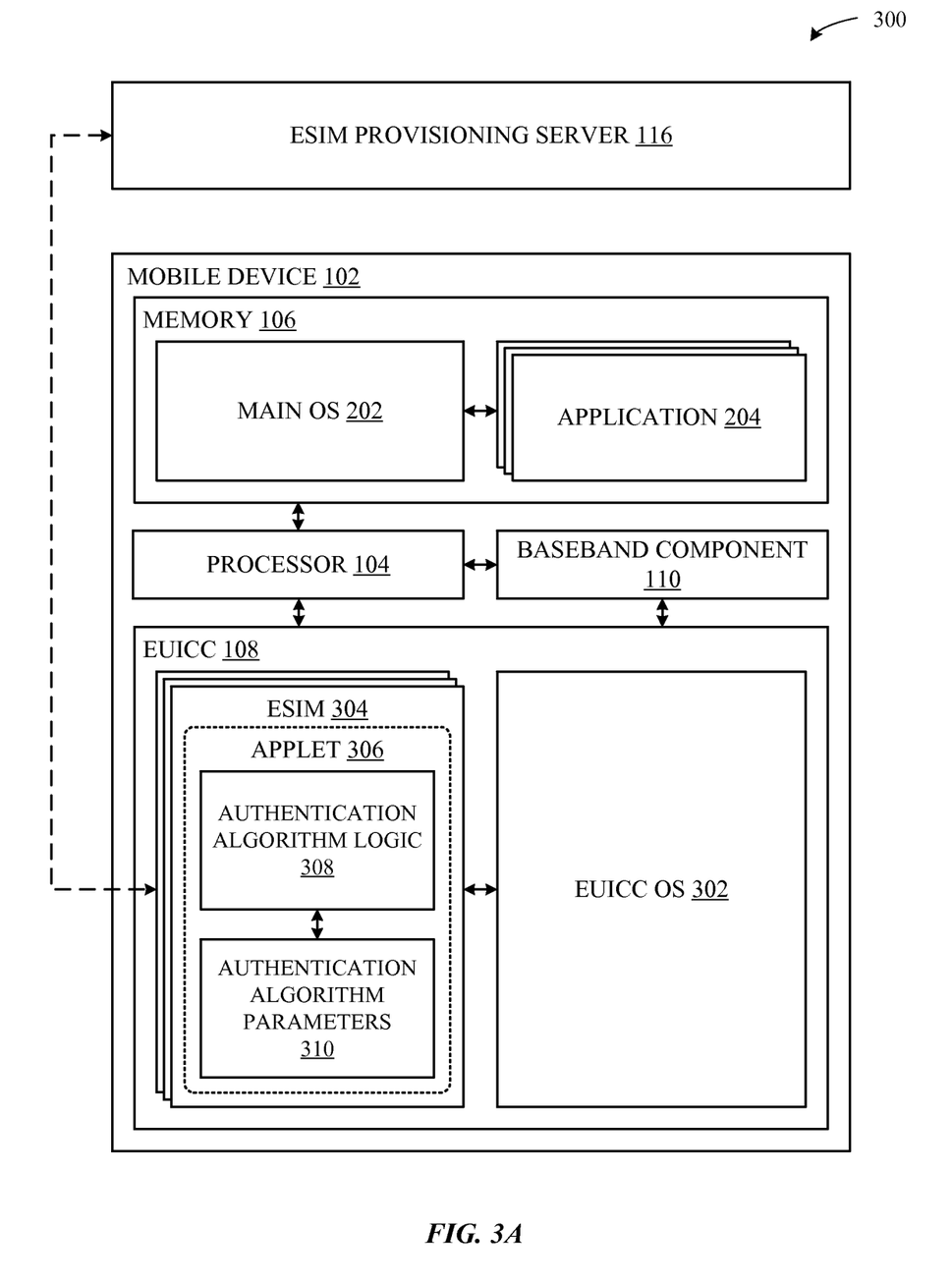
FIG. 3A illustrates a block diagram of a more detailed view of particular components of the mobile device of FIG. 1 that are configured to implement a second technique for dynamically supporting different authentication algorithms, according to some embodiments.

FIG. 3A illustrates a block diagram of a more detailed view 300 of particular components of the mobile device 102 of FIG. 1 that are configured to implement the second technique for dynamically supporting different authentication algorithms, according to some embodiments. As shown in FIG. 3A, the eUICC 108 can be configured to implement an eUICC OS 302 that is configured to manage the hardware resources of the eUICC 108 (e.g., a processor, a random access memory (RAM), and a non-volatile memory, not illustrated in FIG. 3A). Notably, the eUICC OS 302 of FIG. 3A differs from the eUICC OS 206 of FIG. 2A in that the eUICC OS 302 (i) does not manage authentication algorithm logic 208, and (ii) does not implement the authentication algorithm selector 210. Instead, the eUICC OS 302 is configured to manage multiple eSIMs 304, where each eSIM 304 includes (i) authentication algorithm logic 308 (e.g., executable code), and (ii) authentication algorithm parameters 310. According to some embodiments, an eSIM 304 can include an applet 306 (e.g., a Java applet) that enables the eUICC OS 302 to access one or more of (i) authentication algorithm logic 308 (e.g., executable code), and (ii) authentication algorithm parameters 310. According to this configuration, the eUICC OS 302 is configured to, upon receipt of a command to activate an eSIM 304, interface with the eSIM 304 and extract (i) authentication algorithm logic 308 (e.g., executable code), and (ii) authentication algorithm parameters 310. In this manner, the eUICC OS 302 can dynamically support different authentication algorithms by accessing the authentication algorithm logic and parameters that are included in the eSIMs 304.

Figure 3B:
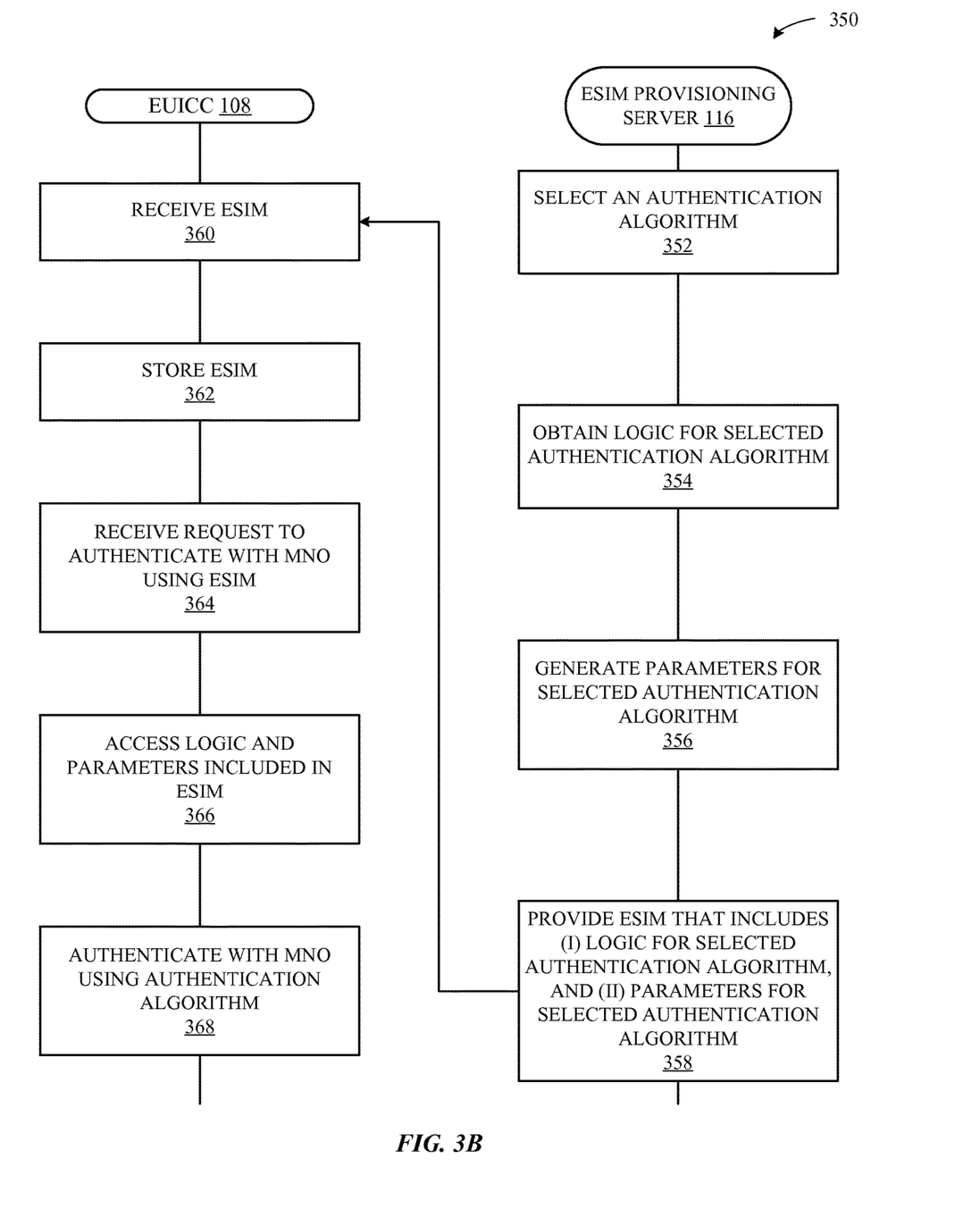
FIG. 3B illustrates a sequence diagram of a method for implementing the second technique for dynamically supporting different authentication algorithms, according to some embodiments.

FIG. 3B illustrates a sequence diagram of a method 350 for implementing the second technique for dynamically supporting different authentication algorithms, according to some embodiments. As shown, the method 350 begins at step 352, where the eSIM provisioning server 116 selects an authentication algorithm to be utilized by an MNO 114 that is requesting an eSIM 304. At step 354, the eSIM provisioning server 116 obtains logic (e.g., authentication algorithm logic 308) for the selected authentication algorithm. At step 356, the eSIM provisioning server 116 generates parameters (e.g., authentication algorithm parameters 310) for the selected authentication algorithm. At step 358, the eSIM provisioning server 116 provides an eSIM 304 that includes (i) logic (e.g., authentication algorithm logic 308) for the selected authentication algorithm, and (ii) parameters (e.g., authentication algorithm parameters 310) for the selected authentication algorithm.

At step 360, the eUICC 108 receives the eSIM 304, and, at step 362, the eUICC 108 stores the eSIM 304. At step 364, the eUICC 108 receives a request to activate the eSIM 304 (e.g., from the main OS 202). At step 366, the eUICC 108 accesses (i) the authentication algorithm logic 308, and (ii) the authentication algorithm parameters 310 included in the eSIM 304. Finally, at step 368, the eUICC 108 authenticates with the MNO 114 using the selected authentication algorithm.

Figure 4:
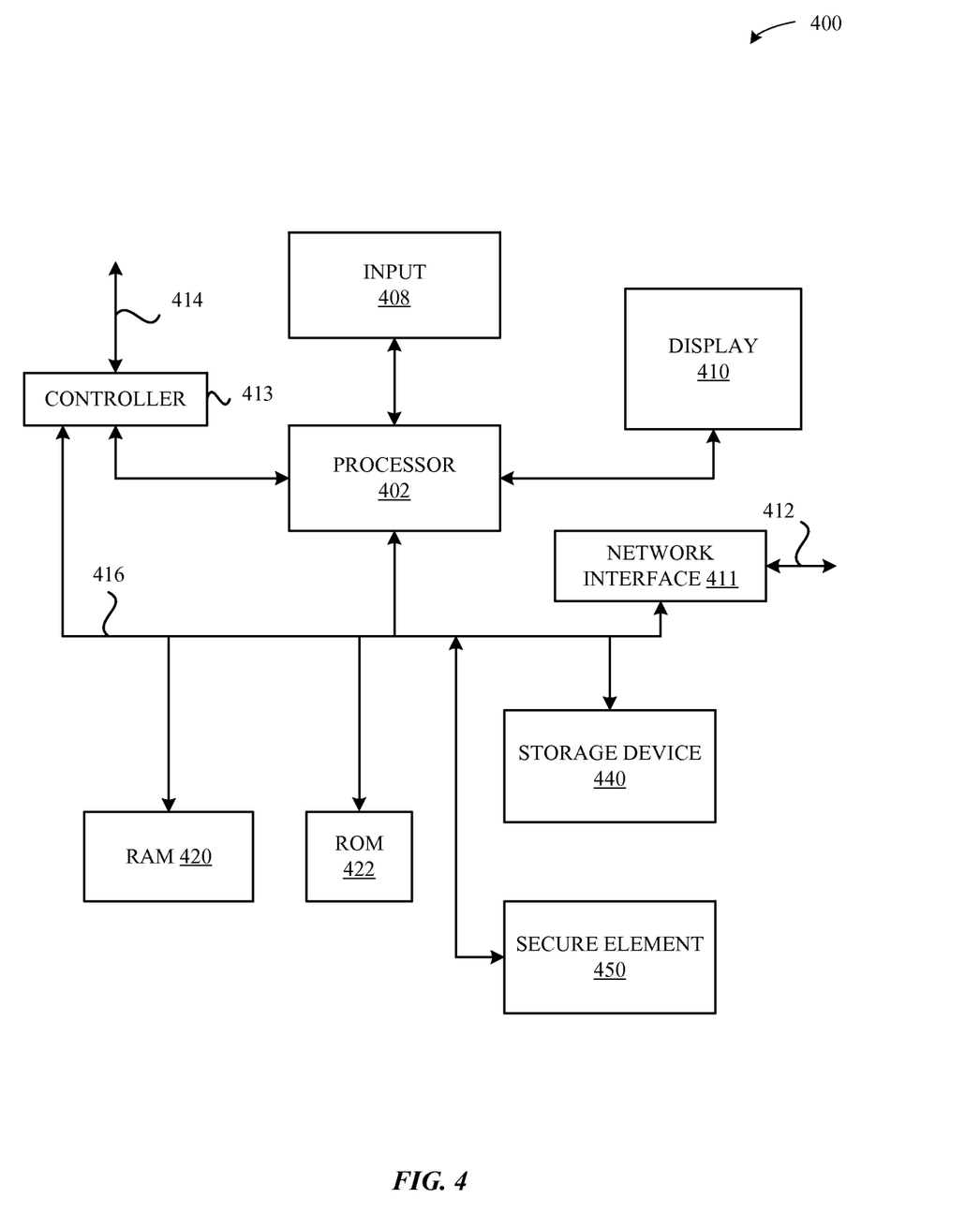
FIG. 4 illustrates a detailed view of a computing device that can be used to implement the various components described herein, according to some embodiments.

FIG. 4 illustrates a detailed view of a computing device 400 that can be used to implement the various components described herein, according to some embodiments. In particular, the detailed view illustrates various components that can be included in the mobile device 102 illustrated in FIG. 1. As shown in FIG. 4, the computing device 400 can include a processor 402 that represents a microprocessor or controller for controlling the overall operation of computing device 400. The computing device 400 can also include a user input device 408 that allows a user of the computing device 400 to interact with the computing device 400. For example, the user input device 408 can take a variety of forms, such as a button, keypad, dial, touch screen, audio input interface, visual/image capture input interface, input in the form of sensor data, etc. Still further, the computing device 400 can include a display 410 (screen display) that can be controlled by the processor 402 to display information to the user. A data bus 416 can facilitate data transfer between at least a storage device 440, the processor 402, and a controller 413. The controller 413 can be used to interface with and control different equipment through and equipment control bus 414. The computing device 400 can also include a network/bus interface 411 that couples to a data link 412. In the case of a wireless connection, the network/bus interface 411 can include a wireless transceiver.

The computing device 400 also include a storage device 440, which can comprise a single disk or a plurality of disks (e.g., hard drives), and includes a storage management module that manages one or more partitions within the storage device 440. In some embodiments, storage device 440 can include flash memory, semiconductor (solid state) memory or the like. The computing device 400 can also include a Random Access Memory (RAM) 420 and a Read-Only Memory (ROM) 422. The ROM 422 can store programs, utilities or processes to be executed in a non-volatile manner. The RAM 420 can provide volatile data storage, and stores instructions related to the operation of the computing device 400. The computing device 400 can further include a secure element 450, which can represent the eUICC 108 illustrated in FIGS. 1, 2A, and 3A, described in detail herein.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, hard disk drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for enabling a mobile device to dynamically support different authentication algorithms, the method comprising:

at an embedded Universal Integrated Circuit Card (eUICC) included in the mobile device, the eUICC having at least one electronic Subscriber Identity Module (eSIM), the at least one eSIM storing executable code for at least one authentication algorithm to be implemented by the eUICC:

receiving a selection of an eSIM that is managed by the eUICC, wherein the eSIM is associated with a Mobile Network Operator (MNO);

extracting from the eSIM first executable code that corresponds to a first authentication algorithm and first authentication parameters that are compatible with the first authentication algorithm;

executing the first authentication algorithm in accordance with the first executable code and the first authentication parameters;

receiving, from an eSIM provisioning server, a replacement eSIM, wherein the replacement eSIM:

is associated with the MNO, includes the first executable code and the first authentication parameters, and includes second executable code that corresponds to a second authentication algorithm and second authentication parameters that are compatible with the second authentication algorithm;

replacing the eSIM with the replacement eSIM;

extracting from the replacement eSIM the second executable code and the second authentication parameters;

receiving from the MNO an over the air (OTA) trigger indicating a switch to use the second executable code and the second authentication parameters; and executing the second authentication algorithm in accordance with the second authentication parameters and the second executable code subsequent to receiving the OTA trigger from the MNO, wherein the eSIM and the replacement eSIM each comprise a corresponding applet that allows the eUICC to access corresponding executable code for respective authentication algorithms to obviate storing the corresponding executable code in an operating system of the eUICC prior to selection for execution.

2. The method of claim 1, wherein executing the first authentication algorithm comprises establishing a secure connection with the MNO that is associated with the eSIM.

3. A method for enabling a mobile device to dynamically support different authentication algorithms, the method comprising:

at an embedded Universal Integrated Circuit Card (eUICC) included in the mobile device, the eUICC storing a plurality of electronic Subscriber Identity Modules (eSIMs) that each comprise executable code for respective ones of a plurality of authentication algorithms implemented by the eUICC, each eSIM comprising an applet that allows the eUICC to access its executable code to obviate storing the executable code in an operating system of the eUICC prior to selection for execution:

receiving an over the air (OTA) trigger, wherein the OTA trigger is used by a mobile network operator (MNO) to reconfigure the mobile device to use a first authentication algorithm of the plurality authentication algorithms;

selecting, from the plurality of eSIMs stored in the eUICC, an eSIM that includes i) first executable code that corresponds to the first authentication algorithm and ii) second executable code that corresponds to a second authentication algorithm;

extracting, from the selected eSIM, the first executable code that corresponds to the first authentication algorithm and first authentication parameters that correspond to the first authentication algorithm;

providing, to the first authentication algorithm, the first authentication parameters;

executing the first authentication algorithm in accordance with the first authentication parameters and the first executable code in order to authenticate with the MNO;

receiving from the MNO a second OTA trigger indicating a switch to use the second executable code that corresponds to the second authentication algorithm and second authentication parameters;

extracting from the eSIM the second executable code that corresponds to the second authentication algorithm and the second authentication parameters that are compatible with the second authentication algorithm, wherein the second authentication algorithm is different than the first authentication algorithm;

providing, to the second authentication algorithm, the second authentication parameters; and executing the second authentication algorithm in accordance with the second authentication parameters and the second executable code subsequent to receiving the second OTA trigger from the MNO.

4. The method of claim 3, further comprising:

receiving, from an eSIM provisioning server, a replacement eSIM for the selected eSIM that includes the second authentication algorithm and the second authentication parameters, and a third executable code and third authentication parameters that correspond to a third authentication algorithm;

replacing the selected eSIM with the replacement eSIM;

receiving from the MNO a third OTA trigger indicating a switch to use the third authentication algorithm;

querying the replacement eSIM for the third executable code that corresponds to the third authentication algorithm that is specific to the replacement eSIM, wherein the third authentication algorithm is different than the second authentication algorithm;

querying the replacement eSIM for the third authentication parameters that correspond to the third authentication algorithm, wherein the third authentication parameters are different than the second authentication parameters;

providing, to the third authentication algorithm, the third authentication parameters; and executing the third authentication algorithm in accordance with the third authentication parameters and the third executable code.

5. The method of claim 4, wherein each of the eSIM and the replacement eSIM correspond to the MNO.

6. The method of claim 5, wherein the MNO provides the replacement eSIM when the MNO chooses to support the third authentication algorithm.

7. The method of claim 3, wherein executing the first authentication algorithm comprises establishing a secure connection with the MNO that is associated with the eSIM.

8. An embedded Universal Integrated Circuit Card (eUICC) configured to dynamically support different authentication algorithms, the eUICC comprising:
a memory configured to store:
a plurality of electronic Subscriber Identity Modules (eSIMs), each eSIM comprising i) executable code for respective ones of a plurality of authentication algorithms, and ii) an applet that allows the eUICC to access its executable code to obviate storing the executable code in an operating system of the eUICC prior to selection for execution; and
a processor configured to carry out steps that include:
receiving an over the air (OTA) trigger, wherein the OTA trigger is used by a mobile network operator (MNO) to configure the eUICC to use a first authentication algorithm of the plurality of authentication algorithms;
selecting an eSIM that includes i) first executable code that corresponds to the first authentication algorithm and ii) second executable code that corresponds to a second authentication algorithm from the plurality of eSIMs stored in the eUICC;
extracting, from the selected eSIM, the first executable code that corresponds to the first authentication algorithm and first authentication parameters that correspond to the first authentication algorithm;
providing, to the first authentication algorithm, the first authentication parameters;
executing the first authentication algorithm in accordance with the first authentication parameters and the first executable code in order to authenticate with the MNO;
receiving from the MNO a second OTA trigger indicating a switch to use the second executable code that corresponds to a second authentication algorithm and second authentication parameters;
extracting from the eSIM the second executable code that corresponds to the second authentication algorithm and the second authentication parameters that are compatible with the second authentication algorithm, wherein the second authentication algorithm is different than the first authentication algorithm;
providing, to the second authentication algorithm, the second authentication parameters; and
executing the second authentication algorithm in accordance with the second authentication parameters and the second executable code subsequent to receiving the second OTA trigger from the MNO.

9. The eUICC of claim 8, wherein executing the first authentication algorithm comprises establishing a secure connection with the MNO that is associated with the eSIM.

10. A mobile device configured to dynamically support different authentication algorithms, the mobile device comprising:
an embedded Universal Integrated Circuit Card (eUICC), wherein the eUICC stores a plurality of electronic Subscriber Identity Modules (eSIMs) that each comprise executable code for respective ones of a plurality of authentication algorithms implemented by the eUICC, each eSIM comprising an applet that allows the eUICC to access its executable code to obviate storing the executable code in an operating system of the eUICC prior to selection for execution, the eUICC is configured to carry out steps that include:
receiving an over the air (OTA) trigger, wherein the OTA trigger is used by a mobile network operator (MNO) to reconfigure the mobile device to use a first authentication algorithm used by an electronic Subscriber Identity Module (eSIM);
selecting an eSIM that includes i) first executable code that corresponds to the first authentication algorithm and ii) second executable code that corresponds to a second authentication algorithm from the plurality of eSIMs stored in the eUICC;
extracting from the selected eSIM, the first executable code that corresponds to the first authentication algorithm and first authentication parameters that correspond to the first authentication algorithm;
providing, to the first authentication algorithm, the first authentication parameters;
executing the first authentication algorithm in accordance with the first authentication parameters and the first executable code, in order to authenticate with the MNO;
receiving from the MNO an OTA trigger indicating a switch to use the second executable code that corresponds to the second authentication algorithm and second authentication parameters;
extracting from the eSIM the second executable code that corresponds to the second authentication algorithm and the second authentication parameters that are compatible with the second authentication algorithm, wherein the second authentication algorithm is different than the first authentication algorithm;
providing, to the second authentication algorithm, the second authentication parameters; and
executing the second authentication algorithm in accordance with the second authentication parameters and the second executable code subsequent to receiving the OTA trigger from the MNO.

11. The mobile device of claim 10, wherein one or more of the first executable code for the first authentication algorithm and the first authentication parameters are managed by the applet included in the eSIM.

12. The mobile device of claim 10, wherein the steps further include:
receiving, from an eSIM provisioning server, a replacement eSIM for the selected eSIM that includes the second authentication algorithm and the second authentication parameters, and a third executable code and third authentication parameters that correspond to a third authentication algorithm;
replacing the selected eSIM with the replacement eSIM;
querying the replacement eSIM for the third executable code that corresponds to the third authentication algorithm that is specific to the replacement eSIM, wherein the third authentication algorithm is different than the second authentication algorithm;
querying the replacement eSIM for the third authentication parameters that correspond to the third authentication algorithm, wherein the third authentication parameters are different than the second authentication parameters;
providing, to the third authentication algorithm, the third authentication parameters; and executing the third authentication algorithm in accordance with the third authentication parameters and the third executable code.

13. The mobile device of claim 12, wherein each of the eSIM and the replacement eSIM correspond to the MNO.

14. The mobile device of claim 13, wherein the MNO provides the replacement eSIM when the MNO chooses to support the second authentication algorithm.

15. The mobile device of claim 10, wherein one of the first authentication algorithm and the second authentication algorithm is a MILENAGE algorithm, and the other one of the first authentication algorithm and the second authentication algorithm is a TUAK algorithm.

16. The eUICC of claim 8, wherein the processor is configured to carry out further steps that include:
receiving, from an eSIM provisioning server, a replacement eSIM for the selected eSIM that includes the second authentication algorithm and the second authentication parameters, and a third executable code and third authentication parameters that correspond to a third authentication algorithm;
replacing the selected eSIM with the replacement eSIM;
receiving from the MNO a third OTA trigger indicating a switch to use the third authentication algorithm;
querying the replacement eSIM for the third executable code that corresponds to the third authentication algorithm that is specific to the replacement eSIM, wherein the third authentication algorithm is different than the second authentication algorithm;
querying the replacement eSIM for the third authentication parameters that correspond to the third authentication algorithm, wherein the third authentication parameters are different than the second authentication parameters;
providing, to the third authentication algorithm, the third authentication parameters; and
executing the third authentication algorithm in accordance with the third authentication parameters and the third executable code.

* * * * *

UNITED STATES PATENT AND TRADEMARK OFFICE
CERTIFICATE OF CORRECTION

PATENT NO. : 10,785,645 B2
APPLICATION NO. : 14/868257
DATED : September 22, 2020
INVENTOR(S) : Li et al.

Page 1 of 1

It is certified that error appears in the above-identified patent and that said Letters Patent is hereby corrected as shown below:

In the Claims

In Claim 14, at Column 13, Line 8: "support the second authentication" should read -- support the third authentication --.

Signed and Sealed this
First Day of December, 2020

Andrei Iancu
*Director of the United States Patent and Trademark Office*